United States Patent
Lee et al.

(10) Patent No.: US 7,483,114 B2
(45) Date of Patent: Jan. 27, 2009

(54) LIQUID CRYSTAL DISPLAY DEVICE, SUBSTRATE BONDING APPARATUS, AND METHOD FOR FABRICATING LIQUID CRYSTAL DISPLAY DEVICE USING THE SAME

(75) Inventors: Hyun Kyu Lee, Seoul (KR); Hyun Sang Chung, Kyonggi-do (KR); Young Suk Park, Kyonggi-do (KR)

(73) Assignee: LG Display Co., Ltd., Seoul (KR)

( * ) Notice: Subject to any disclaimer, the term of this patent is extended or adjusted under 35 U.S.C. 154(b) by 419 days.

(21) Appl. No.: 10/967,263

(22) Filed: Oct. 19, 2004

(65) Prior Publication Data

US 2005/0083478 A1  Apr. 21, 2005

(30) Foreign Application Priority Data

Oct. 20, 2003 (KR) .................. 10-2003-0073056
Oct. 20, 2003 (KR) .................. 10-2003-0073057

(51) Int. Cl.
*G02F 1/1339* (2006.01)
*G02F 1/1341* (2006.01)

(52) U.S. Cl. .............. 349/187; 349/110; 349/156; 349/190

(58) Field of Classification Search ............ 349/42, 349/110, 155, 156, 157, 187, 188, 190
See application file for complete search history.

(56) References Cited

U.S. PATENT DOCUMENTS 4,720,173 A * 1/1988 Okada et al. ............ 349/156
5,684,556 A * 11/1997 Shimamune ............ 349/158
5,726,728 A * 3/1998 Kondo et al. ............ 349/156
5,852,487 A * 12/1998 Fujimori et al. ............ 349/162
6,023,310 A    2/2000 Kawamoto et al. ............ 349/54
6,067,144 A    5/2000 Murouchi ............ 349/156
6,078,379 A    6/2000 Nagae et al. ............ 349/155
6,115,098 A    9/2000 Kume et al. ............ 349/156
2003/0128327 A1 * 7/2003 Noiri ............ 349/156

FOREIGN PATENT DOCUMENTS

| JP | 05-203925 | 8/1993 |
|---|---|---|
| JP | 7-28071 | 1/1995 |
| JP | 07-28701 | 1/1995 |
| JP | 07-056154 | 3/1995 |
| JP | 2000-250049 | 9/2000 |
| JP | 2001-166317 | 6/2001 |
| JP | 2001-264740 | 9/2001 |
| JP | 2002-162633 | 6/2002 |
| JP | 2002-214626 | 7/2002 |
| KR | 10-0144896 B1 | 4/1998 |
| KR | 1998-042841 | 8/1998 |
| KR | 2002-0088447 | 11/2002 |
| KR | 10-20030021743 A | 3/2003 |
| TW | 457386 B | 10/2001 |
| TW | 466365 | 12/2001 |

* cited by examiner

*Primary Examiner*—Dung Nguyen
*Assistant Examiner*—Tai Duong
(74) *Attorney, Agent, or Firm*—Morgan, Lewis & Bockius LLP

(57) ABSTRACT

A liquid crystal display device includes a plurality of guide walls formed at regular intervals on a first substrate, the guide walls extending lengthwise or widthwise within an active region of the first substrate, a liquid crystal material filled between the guide walls, and a second substrate being attached to the first substrate sandwiching the liquid crystal material therebetween.

4 Claims, 9 Drawing Sheets

131a

131a ial injection hole. In a liquid crystal dispensing method, an appropriate amount of the liquid crystal material is dispensed on one of the two substrates, and the two substrates are bonded to each other.

LIQUID CRYSTAL DISPLAY DEVICE, SUBSTRATE BONDING APPARATUS, AND METHOD FOR FABRICATING LIQUID CRYSTAL DISPLAY DEVICE USING THE SAME

The present invention claims the benefit of Korean Patent Application No. P2003-73056 filed in Korea on Oct. 20, 2003 and Korean Patent Application No. P2003-73057, which are hereby incorporated by reference.

BACKGROUND OF THE INVENTION

1. Field of the Invention

The present invention relates to a liquid crystal display device, and more particularly, to a liquid crystal display device and a method for fabricating the same using a liquid crystal dispensing method and a bonding apparatus for bonding substrates at an atmospheric pressure.

2. Discussion of the Related Art

Demands for display devices have increased with development of an information society. Accordingly, many efforts have been made to research and develop various flat display devices, such as liquid crystal display (LCD) devices, plasma display panel (PDP) devices, electro-luminescent display (ELD) devices, and vacuum fluorescent display (VFD) devices. In particular, liquid crystal display (LCD) devices have been most widely used as a substitute for a cathode ray tube (CRT) because of their advantageous characteristics of thin profile, lightness, and low power consumption. LCD devices have been implemented as display devices for notebook computers, desktop computers, televisions, and the like. One consideration in developing LCD devices is to develop LCD devices having a high quality picture, such as high resolution and high luminance with a large-sized screen, while maintaining lightness, thin profile, and low power consumption.

In general, the LCD device includes an LCD panel for displaying an image and a driver for supplying a driving signal to the LCD panel. In addition, the LCD panel includes first and second substrates attached to each other with a cell gap therebetween, and a liquid crystal layer formed in the cell gap. Further, alignment layers are respectively formed on facing surfaces of the first and second substrates, wherein the alignment layers are rubbed to align the liquid crystal layer. For maintaining fixed cell gaps between the first and second substrates, spacers are spread or fixed between the first and second substrates.

The first substrate or a thin film transistor array substrate includes a plurality of gate lines arranged along a first direction, a plurality of data lines arranged along a second direction perpendicular to the first direction, a plurality of pixel electrodes arranged in a matrix-type configuration within pixel regions defined by the crossings of the gate and data lines, and a plurality of thin film transistors for switching signals from the data lines to the pixel electrodes based on signals received from the gate lines.

Further, the second substrate or a color filter array substrate includes a black matrix layer, a color filter layer, and a common electrode. The color filter layer includes red, green, and blue color filters, wherein the color filter layer is formed by repetitively positioning the color filters in order of red(R), green(G), and blue(B) within regions corresponding to the pixel regions of the first substrate. Alternatively, in a liquid crystal display device of an In Plane Switching (IPS) mode, the common electrode may be formed on the first substrate.

Accordingly, the liquid crystal layer controls the intensity of light, and the light passes through the color filter layers of red(R), green(G), and blue(B) to represent color images.

In particular, the liquid crystal display layer is formed by a liquid crystal injection method or a liquid crystal dispensing method. In a liquid crystal injection method, two substrates are bonded to each other with an liquid crystal injection hole formed in the seal pattern, and a liquid crystal material is injected between the two substrates via the liquid crystal injection hole. In a liquid crystal dispensing method, an appropriate amount of the liquid crystal material is dispensed on one of the two substrates, and the two substrates are bonded to each other.

FIG. 1 illustrates a system for bonding substrates using a liquid crystal injection method according to the related art. As shown in FIG. 1, the two bonded substrates 10 are placed into a vacuum chamber 20 having a container 30 holding a liquid crystal material 31 therein. Then, a vacuum pump 25 evacuates the vacuum chamber 20, and the liquid crystal injection hole (not shown) in the bonded substrates 10 contacts the liquid crystal material 31 held in the container 30. Further, air or $N_2$ gas is supplied to the vacuum chamber 20 to bring the vacuum chamber 20 into an atmospheric pressure state. As a result, the liquid crystal material 31 is injected between the two bonded substrates 10 by the capillary tube phenomenon. When the liquid crystal material 31 is filled between the two bonded substrates fully, the liquid crystal injection hole is sealed.

FIG. 2 illustrates a system for bonding substrates using a liquid crystal dispensing method according to the related art. As shown in FIG. 2, a substrate bonding apparatus is placed inside a vacuum chamber 21. The substrate bonding apparatus includes an upper stage 40 for holding a first substrate 10a, a lower stage 41 for holding a second substrate 10b having the liquid crystal material 31 dispensed thereon, a vacuum pump 25 for evacuating the vacuum chamber 21, and a vent means 26 for injecting gas or air into the vacuum chamber 21. Although not shown, the upper, and lower stages 40 and 41 are provided with vacuum holes, and electrostatic chucks for adsorbing and holding the substrates 10a and 10b, respectively.

In addition, a seal pattern 27 is formed on a periphery of the second substrate 10b, and the liquid crystal material 30 is dispensed inside the seal pattern 27. Although not shown, column spacers are formed on one of the first and second substrates 10a and 10b, and an alignment film also is formed on one of the first and second substrates 10a and 10b.

In particular, the first substrate 10a having no liquid crystal material dispensed thereon is loaded on the vacuum chamber 21, and the upper stage 40 is moved down under the control of a moving means 42 to adsorb the first substrate 10a. Then, the second substrate 10b having the liquid crystal material 30 dispensed thereon is loaded on the vacuum chamber 21 and positioned on the lower stage 41, so that the lower stage 41 adsorbs the second substrate 10b by vacuum.

Then, the upper and lower stages 40 and 41 respectively hold the first and second substrates 10a and 10b using the electrostatic chucks for preventing the substrates 10a and 10b from falling off the respective stages 40 and 41 at the time of evacuation of the vacuum chamber 21.

After securing the first and second substrates 10a and 10b with the upper and lower stages 40 and 41, the vacuum pump 25 is turned on to evacuate the vacuum chamber 21. Then, the upper stage 40 is moved down to bond the first and second substrates 10a and 10b with the seal pattern, and air or gas is injected through the vent means 26 to bring the vacuum chamber 21 into an atmospheric state. Then, because an inside of the two bonded substrates is in a vacuum state and the vacuum chamber 21 is in the atmospheric state, the two substrates are pressed and bonded by a pressure difference.

In particular, the bonding of the first and second substrates 10a and 10b are performed in a vacuum state for increasing fluidity of the dispensed liquid crystal material 31 to uniformly distribute the liquid crystal material. If the distribution of the liquid crystal material 31 is not uniform, bubbles may be formed in the resultant liquid crystal layer, thereby causing defects, such as picture distortion in the resultant liquid crystal display panel.

In addition, the apparatus and method for fabricating a liquid crystal display device according to the related art have the following problems. First, the related art liquid crystal injection method requires the vacuum chamber, the vacuum pump, and the like for injection of the liquid crystals in a vacuum state, thereby requiring complex system and increasing production cost. Further, the liquid crystal dispensing method according to the related art also requires the vacuum chamber, the vacuum pump, the electrostatic chucks, and the vent means to perform bonding of the first and second substrates in a vacuum state, thereby increasing production cost. Moreover, since the vacuum chamber needs to be evacuated, overall production time is prolonged, thereby reducing fabrication efficiency.

Furthermore, in the related art, smooth spread of the liquid crystals is achieved by creating a pressure state for the dispensed liquid crystals at a vacuum. However, to create the environment for the liquid crystals at a vacuum is complicate since vacuum suction is not applicable to the holding of the substrates at the stages due to the vacuum state of an inside of the vacuum chamber.

SUMMARY OF THE INVENTION

Accordingly, the present invention is directed to a liquid crystal display device, and a substrate bonding apparatus, and a method for fabricating the liquid crystal display device using the same that substantially obviate one or more of the problems due to limitations and disadvantages of the related art.

An object of the present invention is to provide a liquid crystal display device, and method and bonding apparatus for fabricating the liquid crystal display device using the same that perform a substrate bonding process in an atmospheric state, thereby simplifying a bonding apparatus, shortening a process time period, improving productivity, and reducing production cost.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes a plurality of guide walls formed at regular intervals on a first substrate, the guide walls extending lengthwise or widthwise within an active region of the first substrate, a liquid crystal material filled between the guide walls, and a second substrate being attached to the first substrate sandwiching the liquid crystal material therebetween.

In another aspect, a method for fabricating a liquid crystal display device includes providing first, and second substrates having a plurality of pixel regions, forming guide walls on the second substrate between the pixel regions, dispensing a liquid crystal material on the second substrate having the guide walls formed thereon, and bonding the first and second substrates to each other.

In yet another aspect, a method for fabricating a liquid crystal display device includes dispensing a liquid crystal material on a first substrate, affixing the first substrate having the liquid crystal material dispensed thereon at a lower stage, affixing a second substrate at an upper stage, heating the liquid crystals dispensed on the second substrate to an isotropization temperature, and bonding the first and second substrates to each other.

In another aspect, a liquid crystal display device fabricated using a method including dispensing a liquid crystal material on a first substrate, affixing the first substrate having the liquid crystal material dispensed thereon at a lower stage, affixing a second substrate at an upper stage, heating the liquid crystals dispensed on the second substrate to an isotropization temperature, and bonding the first and second substrates to each other, the liquid crystal display device includes a seal pattern at a peripheral of one of the first and second substrates for bonding the first and second substrates to each other.

In yet another aspect, a substrate bonding apparatus for fabricating a liquid crystal display device includes an upper stage for holding a first substrate, a lower stage for holding a second substrate having a liquid crystal material dispensed thereon, and heating means for heating the liquid crystal material to an isotropization temperature.

In another aspect, a method for fabricating a liquid crystal display device using a substrate bonding apparatus including an upper stage for holding a first substrate, a lower stage for holding a second substrate having a liquid crystal material dispensed thereon, and heating means for heating the liquid crystal material to an isotropization temperature, includes dispensing the liquid crystal material from a dispenser onto the second substrate, and joining the first and second substrates by contacting an inner surface of the first substrate with the liquid crystal material dispensed on the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
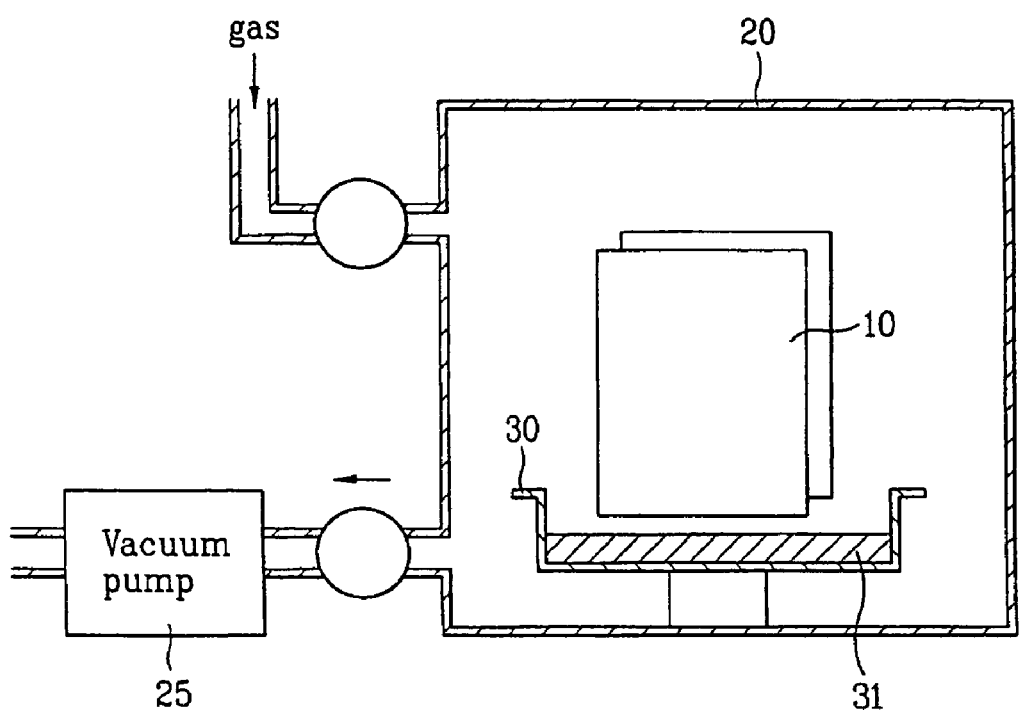
FIG. 1 illustrates a system for bonding substrates using a liquid crystal injection method according to the related art.
Figure 2:
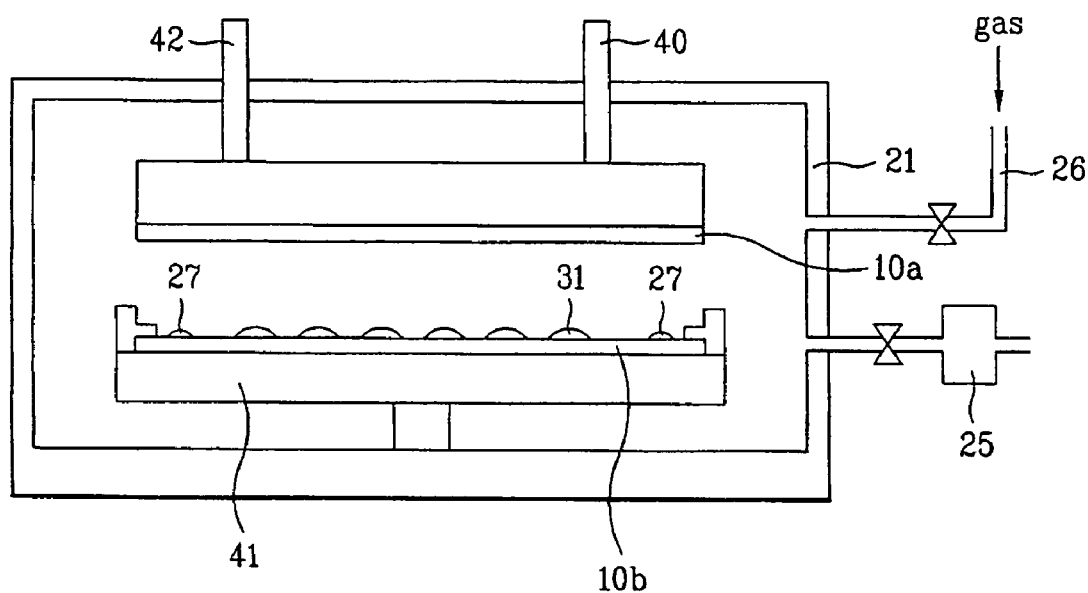
FIG. 2 illustrates a system for bonding substrates using a liquid crystal dispensing method according to the related art.
Figure 3A:
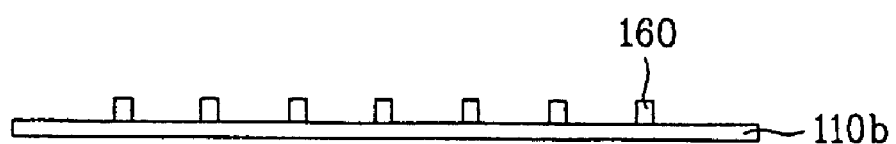
FIG. 3A is a cross-sectional view of a substrate in accordance with an embodiment of the present invention.
Figure 3B:
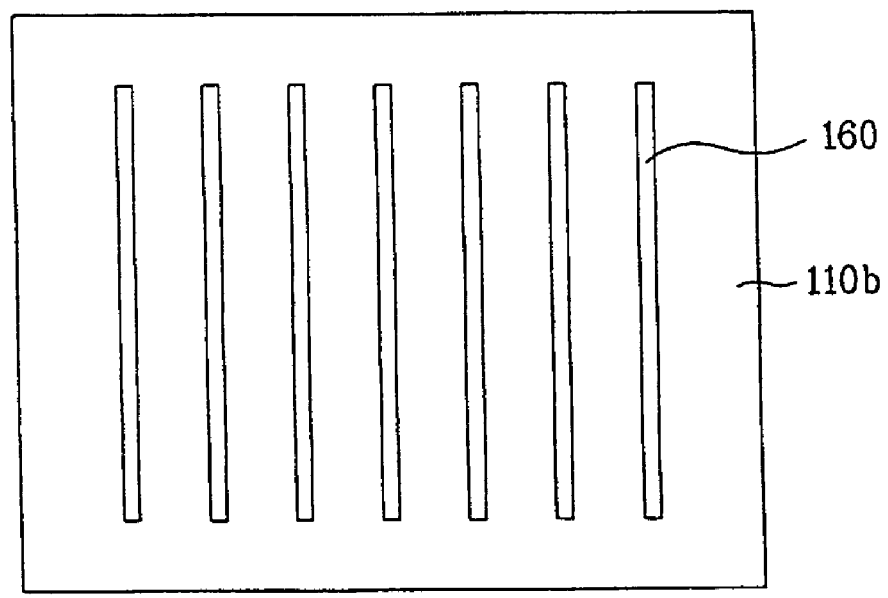
FIG. 3B is a planar view of the substrate shown in FIG. 3A.

FIG. 3A is a cross-sectional view of a substrate in accordance with an embodiment of the present invention, and FIG. 3B is a planar view of the substrate shown in FIG. 3A. In FIG. 3A, a plurality of guide walls 160 are formed a substrate 110b. The substrate 110b may be either an array substrate having thin film transistors formed thereon or a color filter substrate having color filters formed thereon. In addition, the guide walls 160 may be formed projecting from an upper surface of the substrate 110b at regular intervals within a display area of the substrate 10b. The guide walls 160 may include a transparent material, and a cross-section of the guide walls 160 may be rectangular, triangular, trapezoidal or curved. In particular, the guide walls 160 may have a height such that they also function to maintain a cell gap when the substrate 110b is attached to a second substrate (not shown). In other words, the guide walls 160 may function as spacers. Further, as shown in FIG. 3B, the guide walls 160 may be formed parallel to one another in a length-wise direction.

Figure 4:
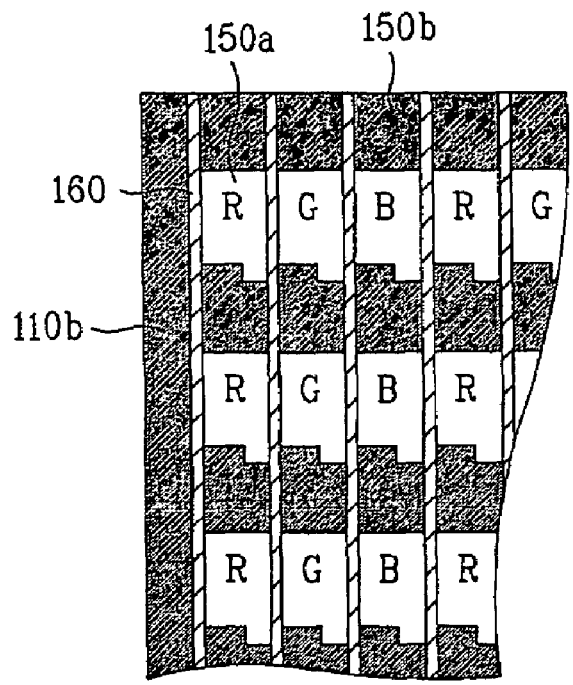
FIG. 4 illustrates a layout of a liquid crystal display panel including the substrate shown in FIG. 3A.

FIG. 4 illustrates a layout of a liquid crystal display panel including the substrate shown in FIG. 3A. In FIG. 4, as an example, the substrate 110b is shown to be a color filter substrate having a black matrix layer 150b formed thereon. In addition, the guide walls 160 are formed at regular intervals corresponding to a plurality of pixel regions 150a. The pixel regions 150a may be defined by the crossing of a plurality of gate and data lines formed on a corresponding substrate (not shown), and the guide walls 160 may be formed in a vertical or horizontal direction of the pixel regions 150a corresponding to the gate lines or the data lines. Alternatively, although not shown, the guide walls 160 also may be formed in both the vertical and horizontal directions similar to the black matrix layer 150b.

Further, a plurality of color filters, R, G and B, may be formed within the pixel regions 150a. In particular, the black matrix layer 150b is a lattice formed on the substrate 110b between the pixel regions 150a. Thus, a liquid crystal material is kept within the pixel regions 150a for selectively transmitting light to display a desired image, while the black matrix layer 150b shield light from regions overlapping the black matrix layer 150b. Therefore, it is preferable that the guide walls 160 are formed along the black matrix layer 150b for not interfering light paths that display the image. Accordingly, the guide walls 160 do not spread irregularly and do not interfere with light paths as the spacers according to the related art.

Since the pixel regions 150a are micronite, the guide walls 160 at the micronite intervals hold the liquid crystal material dispensed on the substrate 110b between the guide walls 160. In particular, a surface tension of the liquid crystal material is formed by a cohesive force of the liquid crystal molecules, and a force between the guide walls 160 and the liquid crystal molecule is an adhesive force. If the cohesive force is greater than the adhesive force, the liquid crystals are filled between the guide walls 160 in a shape convex upward due to the surface tension.

Figure 5:
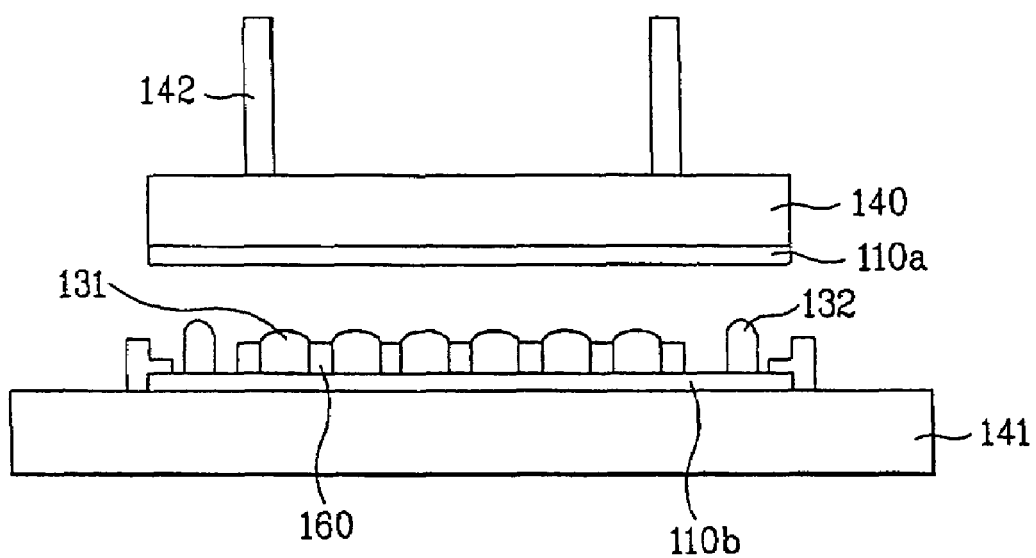
FIG. 5 schematically illustrates a substrate bonding apparatus for fabricating a liquid crystal display device in accordance with an embodiment of the present invention.

FIG. 5 schematically illustrates a substrate bonding apparatus for fabricating a liquid crystal display device in accordance with an embodiment of the present invention. In FIG. 5, a substrate bonding apparatus includes an upper stage 140 and a lower stage 141. In particular, the upper stage 140 may be vertically movable under the control of a stage moving means 142, while the lower stage 141 may remain stationary. Alternatively, one of or both the upper and lower stages 140 and 141 may be movable vertically and/or horizontally.

A liquid crystal material 131 is dispensed on the first substrate 110b which is placed on the lower stage 141. In particular, the liquid crystal material 131 is filled between the guide walls 160 and may have a convex surface shape projecting upward between the guide walls 160 for the reasons described above with respect to FIG. 4.

In addition, a second substrate 110a may be held by the upper stage 140. As the upper stage 140 moves downward controlled by the stage moving means 142 to bond the first and second substrates 110b and 110a, the convex portion/surface of the liquid crystal material 131 is brought into close contact with an underside surface of the second substrate 110a, thereby preventing formation of bubbles in the liquid crystal material 131 even in a non-vacuum environment. Accordingly, the substrate bonding apparatus according to an embodiment of the present invention does not require a vacuum state for operation, and can operate satisfactorily at an atmospheric pressure by using the guide walls 160.

In particular, the first and second substrates 110b and 110a may be bonded to each other by a sealant 132 formed at a peripheral of one of the first and second substrates 110b and 110a. Further, a predetermined cell gap between the first and second substrates 110b and 110a is maintained by the guide walls 160. Thus, the guide walls 160 prevent the liquid crystal material 131 from containing bubbles even if the first and second substrates 110b and 110a are bonded under the atmospheric pressure, and the guide walls 160 also function as spacers for maintaining an uniform cell gap.

Moreover, since the bonding is not performed in the vacuum state, the first and second substrates 110b and 110a can be respectively held at the upper and lower stages 140 and 141 and do not require a complicate electrostatic chuck of the related art. Alternatively, although not shown, a plurality of vacuum holes may be formed in a lower surface of the upper stage 140 and a vacuum pump may be connected to an upper surface of the lower stage 141, thereby bonding the first and second substrates 110b and 110a at the vacuum holes.

The guide walls 160 may be formed of an acryl group material since the acryl group material has high light transmittivity and forms a strong adhesive force with the liquid crystal material 131. In addition, the guide walls 160 may be formed in a desired shape by a photo-lithographic or printing method. Further, the guide walls 160 may be formed of any material that satisfies the above-discussed characteristics.

Alternatively, the first substrate 110b may be an array substrate having a plurality of thin film transistors formed thereon. In particular, the thin film transistors may be formed on the first substrate 110b and the guide walls 160 may subsequently be formed on the first substrate 110b. However, an upper surface of the first substrate 110b should be of a certain flatness after the formation of the thin film transistors, such that the guide walls 160 may be formed uniformly on the first substrate 110b. Further, the guide walls 160 may be formed at positions opposite to the gate lines or the data lines.

Figure 6:
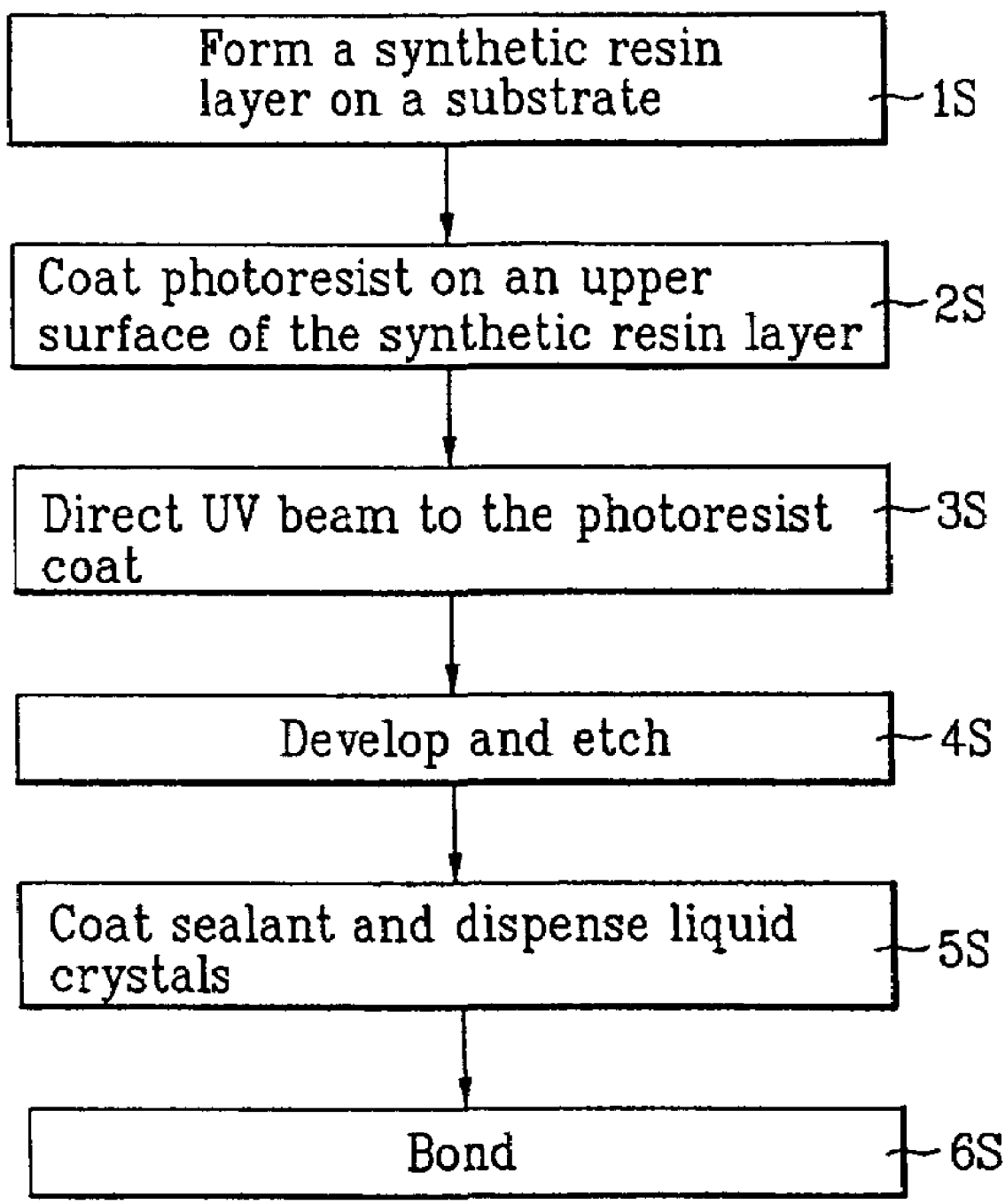
FIG. 6 is a flow chart illustrating a method for forming a liquid crystal display panel in accordance with an embodiment of the present invention.

FIG. 6 is a flow chart illustrating a method for forming a liquid crystal display panel in accordance with an embodiment of the present invention. As shown in FIG. 6, a method for forming a liquid crystal display panel includes forming a synthetic resin layer on a substrate at a first step 1S. The substrate may be a thin film transistor substrate or a color filter substrate. Also, the transparent synthetic resin may include an acryl group material. Then, a photoresist is coated on an upper surface of the synthetic resin layer at a second step 2S.

Further, light, e.g., an UV beam, is directed onto the photoresist through a mask at a third step 3S, such that light is selectively irradiated on the photoresist. In particular, the photoresist may be a negative photoresist or a positive photoresist. Then, the substrate is developed at a fourth step 4S, thereby patterning the photoresist. In addition, the synthetic resin is etched by using the patterned photoresist as a mask to form a plurality of guide walls. Subsequently, the photoresist is removed.

Moreover, a sealant is coated on the substrate having the guide walls formed thereon and an appropriate amount of a liquid crystal material is dispensed on the substrate at a fifth step 5S. In particular, the sealant may be coated on a periphery of a display region of the substrate for preventing the liquid crystal material from flowing outwardly, and the liquid crystal material is dispensed between the guide walls at the display region within the sealant 132. Then, the substrate is bonded to a corresponding substrate at a sixth step S6.

In particular, the substrates may be bonded using the substrate bonding apparatus shown in FIG. 5. For example, if the color filter substrate has the guide walls formed thereon and the liquid crystal material dispensed thereon, the color filter substrate is positioned on the lower stage 141 (shown in FIG. 5), the thin film transistor array substrate is positioned on the upper stage 140 (shown in FIG. 5), and the two substrates are bonded. Alternatively, if the thin film transistor array substrate has the guide walls formed thereon and the liquid crystal material dispensed thereon, the thin film transistor array substrate is positioned on the lower stage 141 (shown in FIG. 5), the color filter substrate is positioned on the upper stage 140 (shown in FIG. 5), and the two substrates are bonded. Then, the sealant is set or cured.

Since the above-described steps are susceptible to dust particles, and a defective pattern caused by the dust particles is liable to cause defects on the whole liquid crystal display panel, it is required that above steps are performed in a clean environment, and strict management of materials/equipment is important. Alternatively or in addition, a cleaning process may be additionally performed between steps to remove any dust particles.

Figure 7:
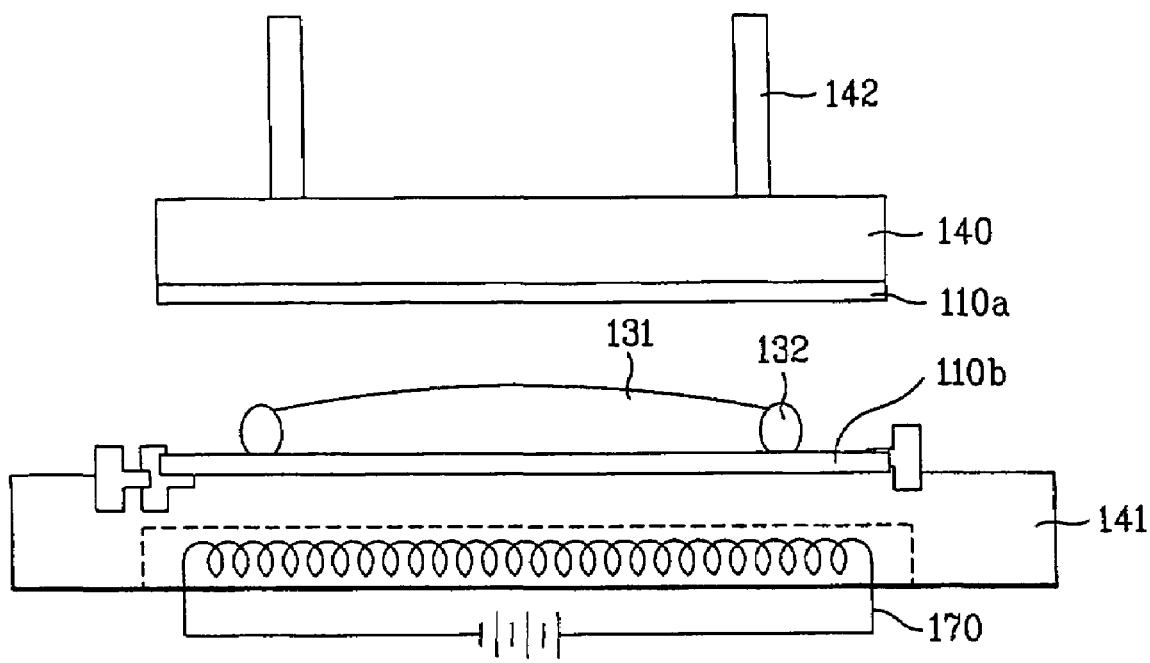
FIG. 7 schematically illustrates a substrate bonding apparatus for fabricating a liquid crystal display device in accordance with another embodiment of the present invention.

FIG. 7 schematically illustrates a substrate bonding apparatus for fabricating a liquid crystal display device in accordance with another embodiment of the present invention. In FIG. 7, a substrate bonding apparatus includes an upper stage 140 and a lower stage 141. In particular, the upper stage 140 may be vertically movable under the control of a stage moving means 142, while the lower stage 141 may remain stationary. Alternatively, one of or both the upper and lower stages 140 and 141 may be movable vertically and/or horizontally.

In addition, a heating means 170 is placed under the lower stage 141. The heating means 170 may be inside of the lower stage 141 or may be mounted separately from the lower stage 141. As the liquid crystal material 131 is dispensed on an upper surface of the first substrate 110b which is placed on the lower stage 141, the liquid crystal material 131 is heated by the heating means 170. In particular, the heating means 170 may heat the liquid crystal material 131 to an isotropization temperature Ti. The heating means 170 may be spaced from the lower surface of the first substrate 110b, thereby forming a space for allowing the heat generated from the heating means 170 be uniformly distributed to the lower surface of the first substrate 110b. Also, the first substrate 110b may be a thin film transistor substrate but may more preferably be a color filter substrate, since a thin film transistor substrate may include heat sensitive circuits formed thereon.

Further, a heat pipe having a two-phase flow (not shown) may be provided between the heating means 170 and the first substrate 10b to enhance the heat distribution. By injecting a liquid phase material into the heat pipe, and adjusting an inside pressure to set a temperature at which the two-phase flow starts in the neighborhood of the isotropization temperature Ti, a more uniform heat transfer between the heating means 170 and the lower stage 141 can be made by phase change and convection heat transfer of the two-phase flow at an elevated temperature. That is, as a higher density liquid phase working substance positions at a surface in contact with the heating means 170 by gravity, and a gas phase working substance positions at a surface in contact with the first substrate 110b or the lower stage 141, the heat transfer from a lower portion to an upper portion is made through phase change. In a process in which the gas phase working substance positioned at the upper portion of the heat pipe heat exchanges with the lower stage 141 or the first substrate 110b, and condenses to move downward, the upper surface of the heat pipe can always have a uniform temperature distribution. Accordingly, the heat pipe can perform heat transfer to the first substrate 110b at a uniform temperature, with a more heat transfer quantity. For example, a plurality of the heat pipes may be mounted in shapes of pipes and the heat pipes may have a flat hexahedral shape corresponding to a size of the first substrate 110b.

In addition, a second heating means (not shown) may be provided on an upper side of the upper stage 140. Thus, the second heating means may supplement the heating means 170 to heat the substrate held at the upper stage 140 to or over a predetermined temperature, such that the liquid crystal material 131 is at or above the isotropization temperature Ti at the moment of the bonding.

Moreover, a plurality of vacuum holes (not shown) may be formed in an underside surface of the upper stage 140 or in an upper surface of the lower stage 141. In particular, the vacuum holes may be connected to a vacuum pumping device for holding the substrates 110a and 110b by vacuum.

Figure 8:
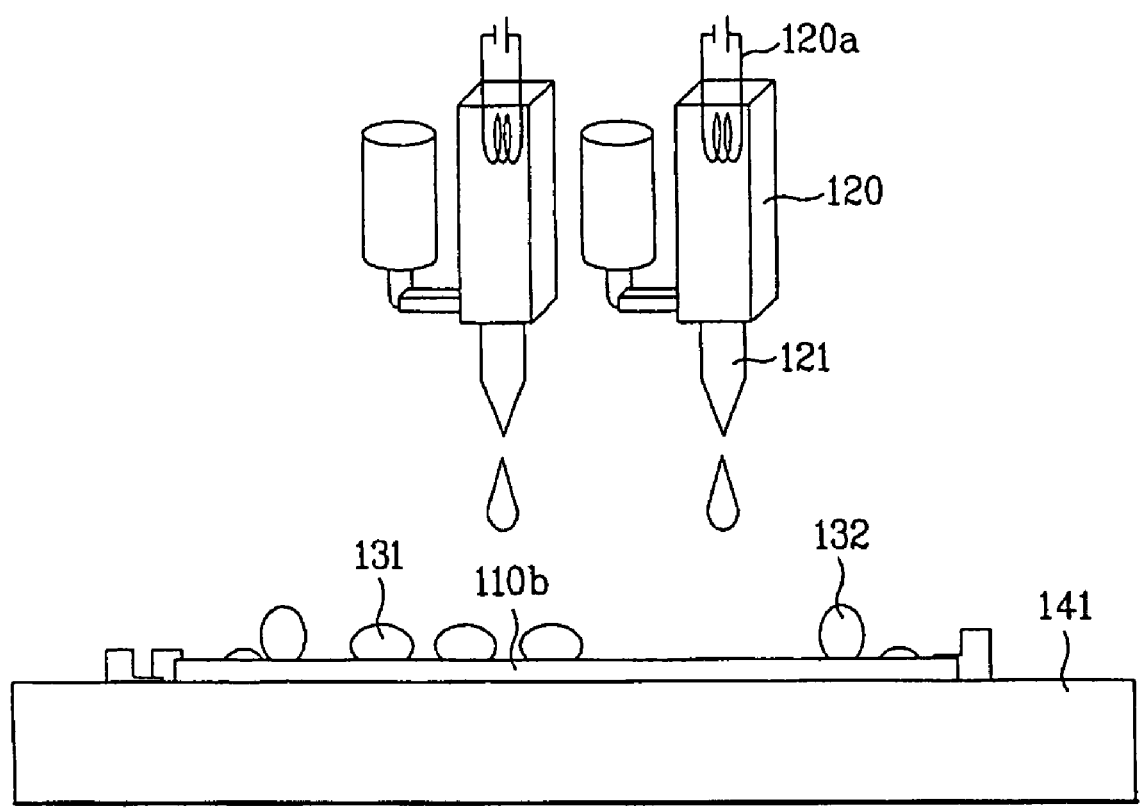
FIG. 8 schematically illustrates a process for dispensing a liquid crystal material in accordance with an embodiment of the present invention.

FIG. 8 schematically illustrates a process for dispensing a liquid crystal material in accordance with an embodiment of the present invention. As shown in FIG. 8, the liquid crystal material 131 may be dispensed on the upper surface of the first substrate 110b by dropping a plurality of dots of the liquid crystal material 131 via a nozzle 121 on the first substrate 110b. To form an even layer of the liquid crystal material 131 across the upper surface of the first substrate 110b, the lower stage 141 may be moved respective to the nozzle 121.

In addition, the nozzle 121 may be connected to a syringe 120. The syringe 120 may be connected to a reservoir storing the liquid crystal material 131. Further, the syringe 120 may include a preheating means 120a for heating the liquid crystal material 131 before dispensing/dropping the liquid crystal material 131 onto the first substrate 110b. In particular, the preheating means 120a may preheat the liquid crystal material 131 to a predetermined temperature, such that in combination with the heating means 170 (shown in FIG. 7), the liquid crystal material 131 reaches to the isotropization temperature Ti when the first and second substrates 110b and 110a are bonded to each other. Accordingly, the liquid crystal material 131 may be more easily spread across the upper surface of the first substrate 110b for reasons which will be explained more in details with respect to FIGS. 9A and 9B.

Figure 9A:
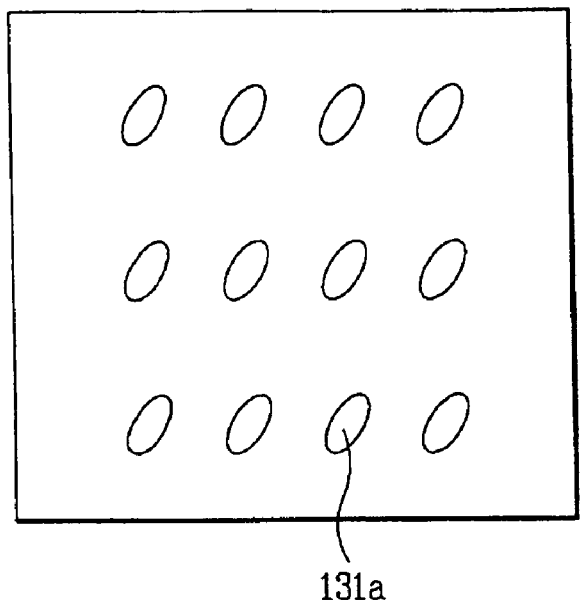
FIG. 9A schematically illustrates an arrangement of liquid crystal molecules at an atmospheric pressure and a room temperature in accordance with an embodiment of the present invention.
Figure 9B:
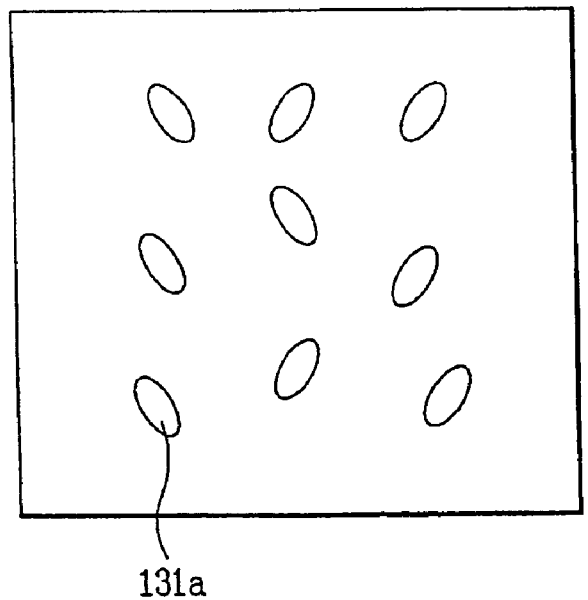
FIG. 9B schematically illustrates an arrangement of liquid crystal molecules at an atmospheric pressure and in a state heated at or over an isotropization temperature Ti in accordance with an embodiment of the present invention.

FIG. 9A schematically illustrates an arrangement of liquid crystal molecules at an atmospheric pressure and a room temperature in accordance with an embodiment of the present invention, and FIG. 9B schematically illustrates an arrangement of liquid crystal molecules at an atmospheric pressure and in a state heated at or over an isotropization temperature Ti in accordance with an embodiment of the present invention.

As shown in FIG. 9A, at an atmospheric pressure and a room temperature, the liquid crystal material is in a liquid crystal phase, which is an intermediate phase between a liquid phase and a solid phase. When in the liquid crystal phase, the liquid crystal material has some fluidity but also has an orientation similar to a solid, thereby having a poor spreadability. In particular, liquid crystal molecules 131a are oriented regularly, such that the liquid crystal molecules 131a do not spread well due to an interference between the liquid crystal molecules 131a and high viscosity after the liquid crystal molecules 131a are dispensed on the substrate. Accordingly, if the substrates are bonded when the liquid crystal molecules 131a do not spread well, air layers are formed between the liquid crystal molecules 131a, thereby creating bubbles in the resultant liquid crystal layer and causing a defect in the resultant liquid crystal display panel.

As shown in FIG. 9B, when the liquid crystal material is heated to a temperature at or over the isotropization temperature Ti at an atmospheric pressure, the solid-like arrangement of the liquid crystal molecules 131a (as shown in FIG. 9A) loosens and becomes less regular and less rigid. As a result, the interference between the liquid crystal molecules 131a reduces, such that the liquid crystal molecules 131a can be spread more smoothly to an even film shape. Accordingly, if the substrates are bonded after the liquid crystal material is heated to or over the isotropization temperature Ti, the evacuation of an inside of the bonding apparatus is not required to bond the substrates at the atmospheric pressure.

When a thermotropic liquid crystal material is heated to a temperature higher than the isotropization temperature Ti, the liquid crystal material undergoes a phase change and its molecular orientation/arrangement loosens. As a result, viscosity of the liquid crystal material reduces and fluidity of the liquid crystal material increases, such that the thermotropic liquid crystal material spreads well like a general fluid. In addition, the isotropization temperature Ti differs for various types of liquid crystal materials. For example, for nematic liquid crystals, the isotropization temperature Ti is in a range of about 70~80° C.

Figure 10:
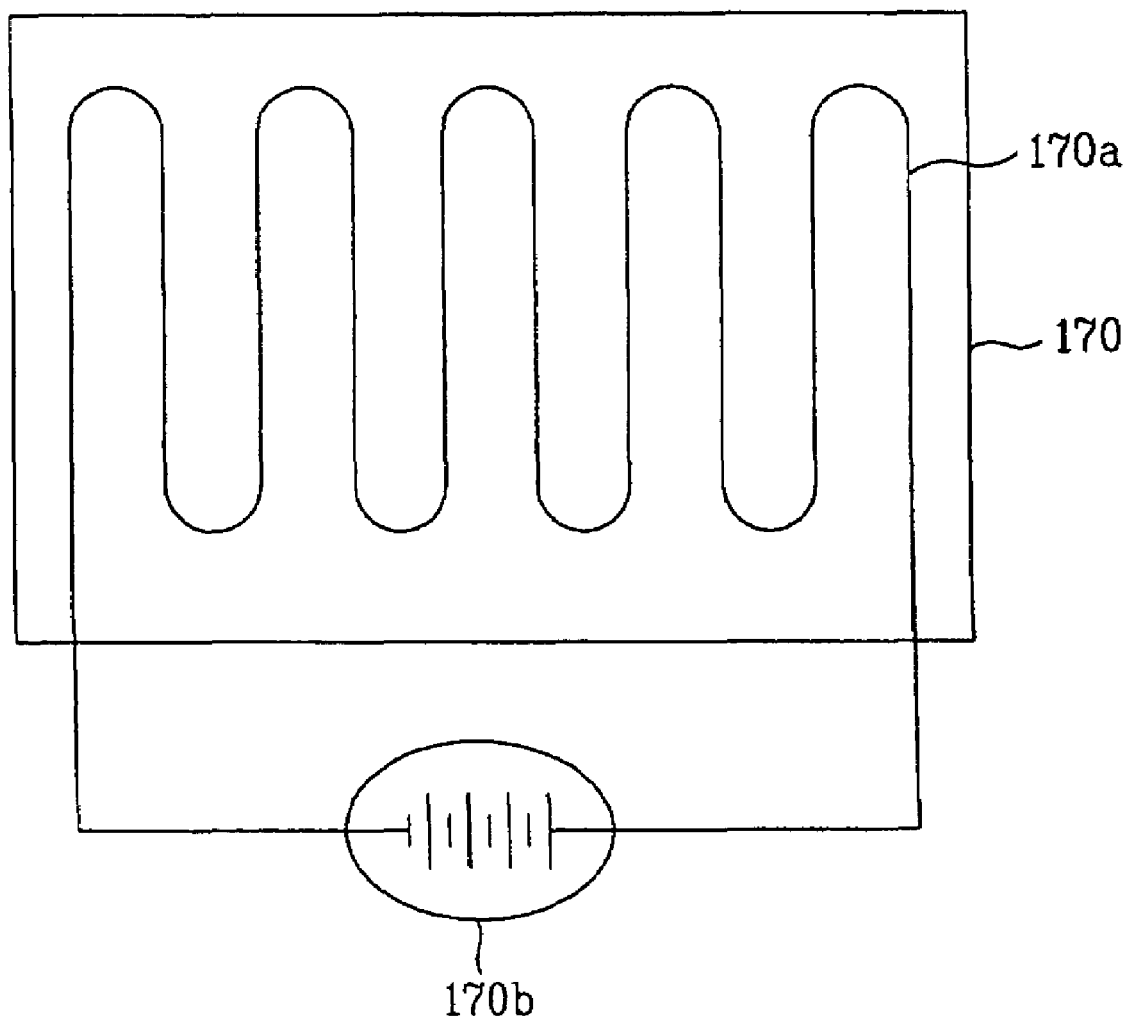
FIG. 10 illustrates a planar view of a heating means in accordance with an embodiment of the present invention.

FIG. 10 illustrates a planar view of a heating means in accordance with an embodiment of the present invention. As shown in FIG. 10, the heating means 170 may include hot wires 170a connected electrically for generating heat. Thus, when electricity is supplied to the hot wires 170a from a power source 170b, the hot wires 170a function as a resistor to generate heat at a desired temperature. Although not shown, the heating means 170 may include other types of heating devices to dispense heat onto the first substrate 110b (shown in FIG. 7).

A method for bonding substrates by using the substrate bonding apparatus for fabricating a liquid crystal display in accordance with another embodiment of the present invention will be described in more detail by referring to FIG. 7. First, a sealant 132 is coated at a peripheral of the first substrate 110b, and an appropriate amount of the liquid crystal material 131 is dispensed on the first substrate 110b inside the sealant 132. Of course, the sealant may be coated on the second substrate 110a, and the liquid crystals may be dispensed on the first substrate 110b.

Then, the second substrate 110a is held by the upper stage 140, and the first substrate 110b having the liquid crystals dispensed thereon is held by the lower stage 141. The first and second substrates 110b and 110a may be moved to the stages 140 and 141 by using a loader, a lift bar or the like. In addition, the stages 140 and 141 may generate a vacuum suction force to more securely hold the substrates.

Further, electricity is supplied to the heating means 170 to heat the liquid crystal material 131 dispensed on the first substrate 110b. Upon heating the liquid crystal material 131 over the isotropization temperature Ti, arrangement of the liquid crystal molecules 131a (shown in FIGS. 9A and 9B) loses orientation and improves fluidity of the liquid crystal material 131. Accordingly, stable bonding of the substrates is possible because the liquid crystal material 131 can be spread evenly on the upper surface of the first substrate 110b even under an atmospheric pressure. Therefore, different from the related art, it is not required to bond the substrates at a vacuum state.

If the liquid crystal material 131 is preheated before being dispensed, a time period for heating the liquid crystal material 131 to the isotropization temperature Ti can be shortened. In particular, the liquid crystal material 131 may be preheated by the preheating device 120a.

Further, after the liquid crystal material 131 is heated over the isotropization temperature Ti, the first and second substrates 110b and 110a are bonded, and the sealant 132 is set. In particular, the temperature of the liquid crystal material 131 may be measured directly by placing a temperature sensor, such as a thermocouple, in direct contact with the liquid crystal material 131.

Alternatively, the temperature of the liquid crystal material 131 may be estimated indirectly by measuring a temperature in the vicinity of the liquid crystal material 131. For example, while maintaining the air temperature in the work room constant, a temperature of the heating means 170/120a or the lower stage 141 is measured to estimate the temperature of the liquid crystal material 131. In particular, a quantity of heat transfer from the heating means is reduced if the measured liquid crystal temperature is higher than the isotropization temperature Ti, or is increased if the measured liquid crystal temperature is lower than the isotropization temperature Ti. Such a process may be controlled by a control means, such as a microcomputer.

As a result, the liquid crystal display device, and substrate bonding apparatus and method for fabricating the same according to an embodiment of the present invention has the following advantages. First, the formation of the guide walls on the first or second substrate enables the liquid crystal material be formed between the guide walls and prevents bubbles from occurring even if the bonding process is performed at an atmospheric pressure. Thus, extra units, such as the vacuum pump, the vacuum chamber, and the like, are not required, thereby simplifying the bonding apparatus. In addition, since the guide walls formed on the black matrix layer excluding the pixel regions also function to maintain a cell gap between the two substrates, no spacers are required additionally and light paths are not interfered.

Further, by bonding the substrates at an atmospheric pressure avoids evacuation of the work room, thereby significantly reducing processing time and improving productivity. Moreover, the present invention permits to make more stable and effective holding of the substrates at the stages by forming a plurality of vacuum holes in the stages, which provide vacuum suction force, without using the complicate electrostatic chucks for holding the substrates at the stages.

Furthermore, by heating the liquid crystal material to isotropization temperature Ti by using the heating means and/or the preheating means, an even film of the liquid crystal material is formed without having bubbles formed therein even if the bonding process is performed at an atmospheric pressure. Thus, extra units, such as the vacuum pump, the vacuum chamber, and the like, are not required, thereby simplifying the bonding apparatus and significantly improving productivity.

It will be apparent to those skilled in the art that various modifications and variations can be made in the liquid crystal display device, and substrate bonding apparatus and method for fabricating the same of the present invention without departing from the sprit or scope of the invention. Thus, it is intended that the present invention covers the modifications and variations of this invention provided they come within the scope of the appended claims and their equivalents.

What is claimed is:

1. A method for fabricating a liquid crystal display device, comprising:
   providing first, and second substrates having a plurality of pixel regions;
   forming guide walls on the second substrate between the pixel regions;
   preheating of the liquid crystal material;
   dispensing the preheated liquid crystal material on the second substrate having the guide walls formed thereon, wherein the liquid crystals are filled between the guide walls in a shape convex upward due to a surface tension of the liquid crystal material when a cohesive force of the liquid crystal molecules is greater than an adhesive force between the guide walls and the liquid crystal molecules; and
   bonding the first and second substrates to each other at an atmospheric pressure, wherein the convex portion of the liquid crystal material is close contact with the first substrate, thereby preventing formation of bubbles in the liquid crystal material.

2. The method of claim 1, wherein the step of forming the guide walls includes coating and patterning an acryl group material.

3. The method of claim 1, wherein the second substrate is a thin film transistor substrate having gate lines and data lines formed thereon, and the guide walls are formed overlapping at least one of the gate lines and the data lines.

4. The method of claim 1, wherein the second substrates is a color filter substrate having a black matrix layer formed on regions except the pixel regions, and the guide walls are formed in a vertical or horizontal direction overlapping a portion of the black matrix layer.

* * * * *